Jan. 18, 1966      F. B. FERRIS, JR      3,229,789
PLURAL BRAKING SYSTEMS
Filed Oct. 23, 1963      2 Sheets-Sheet 1
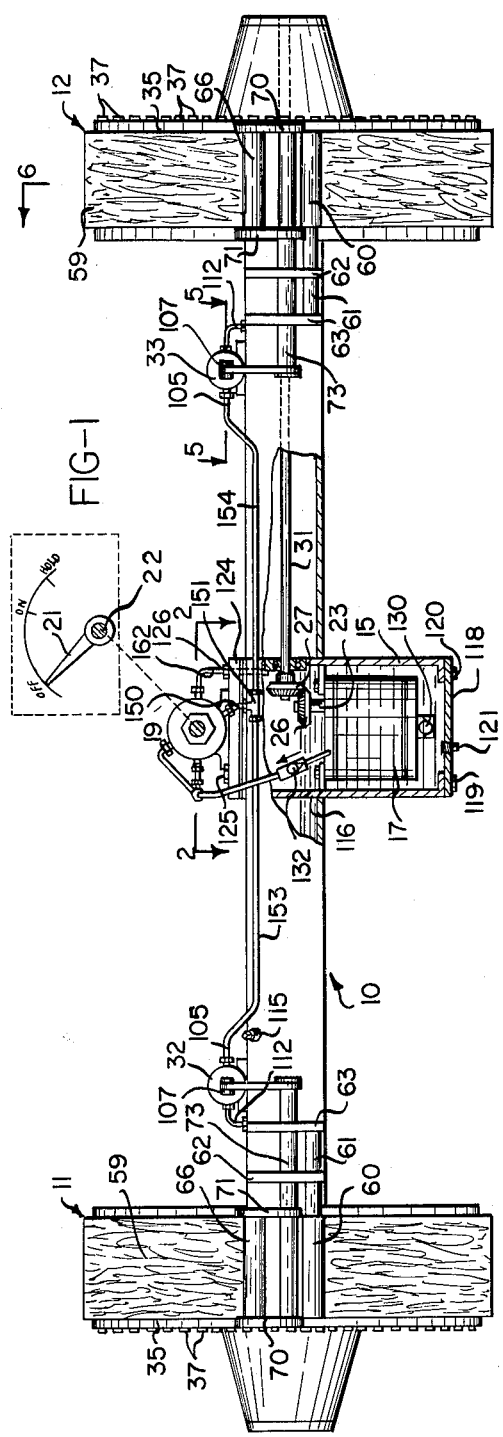
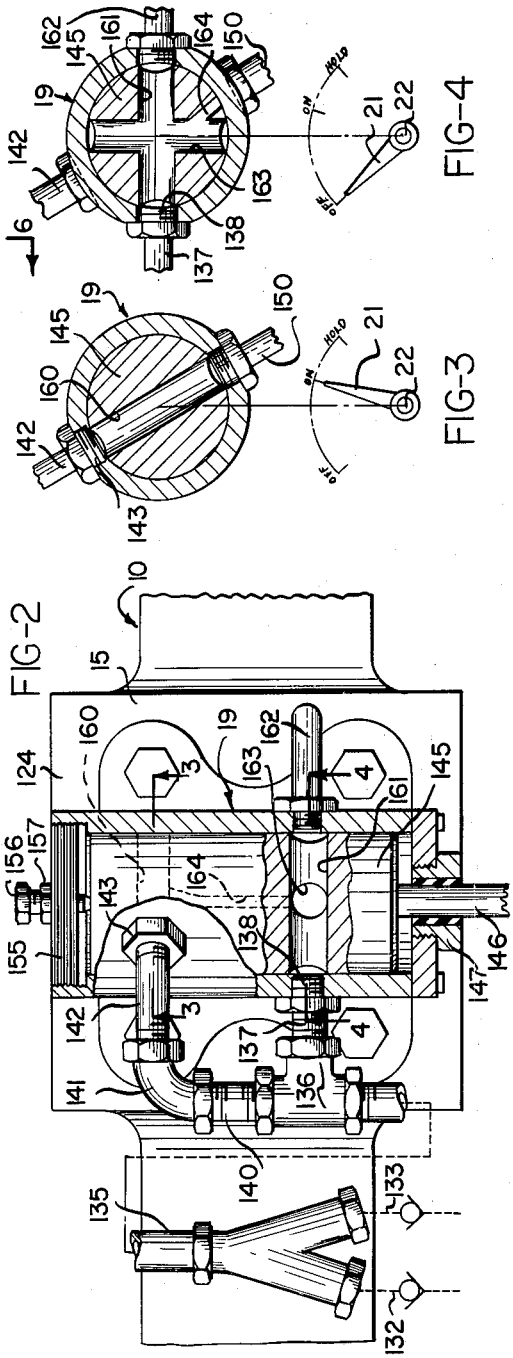
INVENTOR.
FRANK B. FERRIS JR.
BY
Edward C. Walsh
ATTORNEY

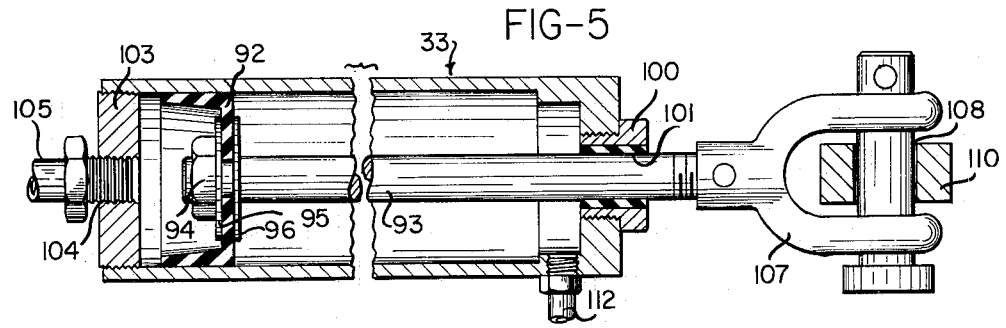
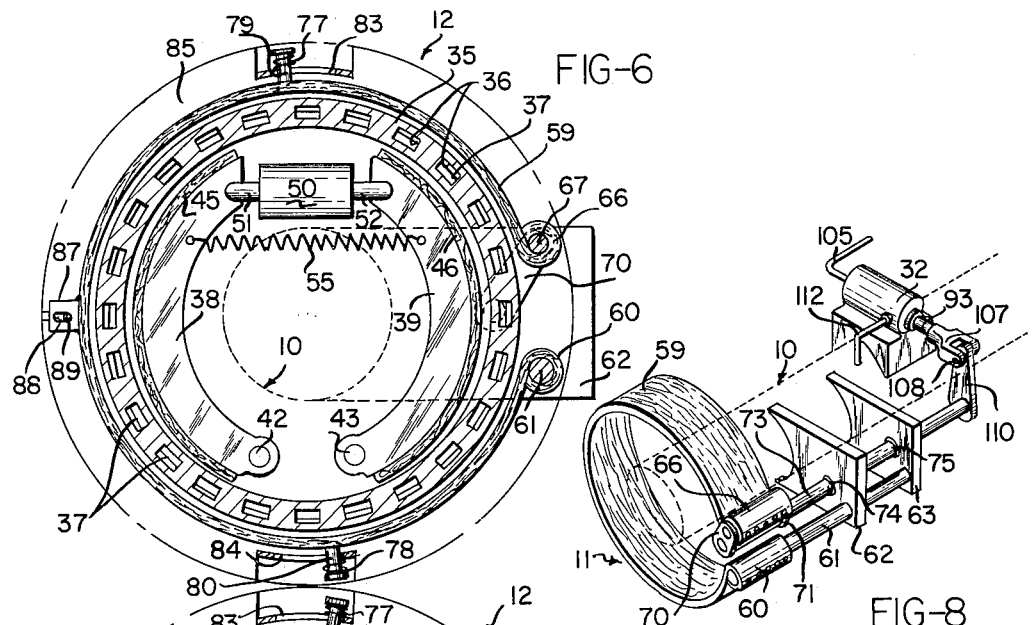
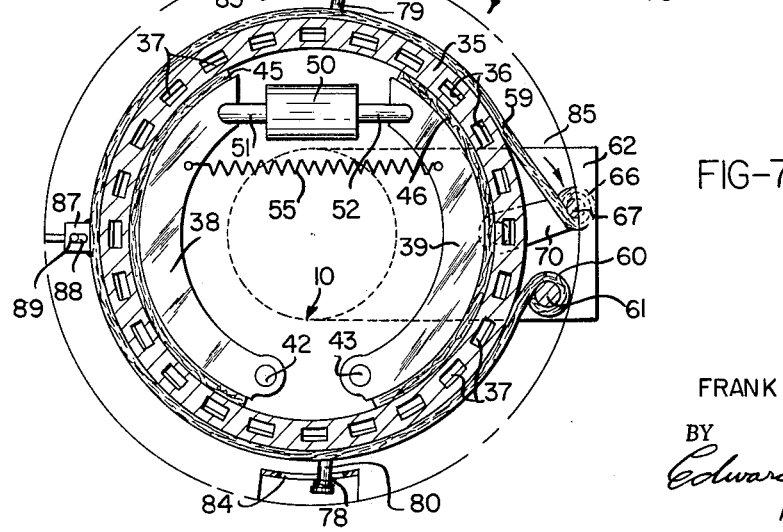

United States Patent Office 3,229,789
Patented Jan. 18, 1966

3,229,789
PLURAL BRAKING SYSTEMS
Frank B. Ferris, Jr., 1128 N. 8th St., Colton, Calif.
Filed Oct. 23, 1963, Ser. No. 318,392
4 Claims. (Cl. 188—106)

This invention relates to a braking system for all types of vehicles and more particularly to a braking system embodying therein auxiliary brakes. The invention is particularly applicable to trucks, trailers, heavy earth-moving equipment, cars, etc. but it is adaptable to any type of vehicle.

In a preferred form of the invention, the system embodies an auxiliary braking system which system may be used independently or in conjunction with any other regular type of brake system that may be embodied in the vehicle, which system may be an air-operated type, mechanical, hydraulic, electrical, or otherwise.

In many types of vehicles, particularly heavy trucks and the like, it is desirable to have an auxiliary braking system which is operable in conjunction with the regular braking system and/or which is available in the event of failure of the regular braking system. It is a primary object of this invention to provide an auxiliary braking system which will offer the maximum in the way of safety protection from the standpoint of the availability of the auxiliary braking system in the event of failure of the regular brakes.

Further objects of the invention lie in the particular means and arrangements whereby the aforesaid primary object is realized. In a preferred form of the invention, the auxiliary braking system comprises separate brake bands and separate actuating means. In a preferred form of the invention, the auxiliary brakes are hydraulic being operated by a hydraulic pump which is double acting, and which is driven directly from a wheel of the vehicle. In this way, power for the auxiliary brakes is always available whenever the vehicle is moving. The auxiliary braking system may be associated with a driven axle or with any of the axles of a multiple-axle vehicle.

One of the objects of the invention is to provide means to realize the purpose of insuring that power is available for operating the auxiliary brakes whenever the vehicle is in motion.

Means are provided for controlling or operating the auxiliary brakes separately from the regular brakes. The control means are of course positioned to be readily accessible to the operator of the vehicle. Preferably, these control means are arranged to provide positions including "On," "Off," and "Hold" positions, the hold position being a position in which the hydraulic pressure is held on the actuators for the auxiliary brakes.

Further objects and additional advantages of the invention will become apparent from the following detailed description and annexed drawings illustrating the preferred form of the invention.

In the drawings:

FIG. 1 is a view partly in section of a vehicle axle having the invention embodied therein;

FIG. 2 is a sectional view taken on the line 2—2 of FIG. 1;

FIG. 3 is a sectional view taken on the line 3—3 of FIG. 2;

FIG. 4 is a sectional view taken on the line 4—4 of FIG. 2;

FIG. 5 is a sectional view taken on the line 5—5 of FIG. 1;

FIG. 6 is a sectional view taken on the line 6—6 of FIG. 1;

FIG. 7 is a view similar to FIG. 6 showing the brake bands in a different position;

FIG. 8 is a perspective view showing the actuation of one of the auxiliary brake bands or shoes.

Referring more particularly to FIG. 1 of the drawings, this figure illustrates partly diagramatically one of the axles of the vehicle having the braking system of the invention embodied therein. As pointed out in the foregoing, this may be a driven axle of a vehicle, or it may be any one of the axles of a multiple-axle vehicle. In FIG. 1 the axle housing is designated at 10 and the brake assemblies are designated generally at 11 and 12. The axle 10 is shown by way of example as being an axle of a multiple-axle vehicle other than the driven axle. A housing designated generally at 15 is provided at an intermediate point of the axle 10. The axle may be constructed in parts adjoined to this housing, or the housing may be built around the intermediate part of the axle. The components of the braking system include a double-acting hydraulic pump 17 which develops a discharge pressure either when operating in the forward or reverse direction. The actuators for the auxiliary brakes are controlled by a component designated at 19 which is a rotary type of valve actuatable at a position in the cab of the vehicle if the vehicle is a truck, or otherwise accessible to the driver. The control means operated by the driver is shown diagrammatically in FIG. 1 as comprising a lever 21 operable about a shaft 22 and having off, on, and hold positions as will be described more in detail presently.

All of the various components of the system will be separately described in detail.

The hydraulic pump 17 has a drive shaft 23 on which is a bevel gear 26 which meshes with a bevel gear 27 on a shaft 31. The shaft 31 extends through the brake assembly 12 and is driven by one of the vehicle wheels so that there is power for the hydraulic pump 17 whenever the vehicle is in motion.

The auxiliary brakes are actuated by hydraulic actuators in the form of hydraulic cylinders as designated in FIG. 1 at 32 and 33. The manner in which these hydraulic actuators or cylinders operate will be described in detail presently.

FIGS. 6 and 7 show the details of the brake assembly 12 as designated in FIG. 1. The brake drum is designated at 35. Preferably the brake drum has spaced openings 36 through it, each one of these openings having a vane or scoop 37 as shown to pick up the air and circulate it through the opening for cooling.

Regular brake shoes or bands as shown in FIGS. 6 and 7 are positioned inside of the drum 35. The brake shoes are designated at 38 and 39, comprising arcuate members pivotally mounted on pivots 42 and 43 and having braking or brake shoe material 45 and 46 carried thereon and cooperable with the interior of the brake drum 35. The regular brakes are operated in any conventional manner such as shown by way of example, by the hydraulic cylinder or other equivalent actuating means as designated at 50 connected to the brake shoes by members 51 and 52. The brake shoes 38 and 39 are biased out of braking position by the tension spring 55.

In the preferred form of the invention, the auxiliary brakes are installed to cooperate with the same brake drums such as indicated at 35, the auxiliary braking means being external of the drums as shown. As shown in FIGS. 6 and 7, the auxiliary brakes comprise a brake band as designated at 59 on the outside of the drum 35. FIG. 8 illustrates a preferred manner of mounting or installation and actuation of the auxiliary brakes. The band 59 has a loop 60 on one end secured on a rod or stem 61 mounted in brackets 62 and 63 secured to the axle 10 as shown. The brake band 59 has a loop 66 at the other end and this loop is on a rod 67 the ends of which are carried on two short arms 70 and 71 which are mounted on an actuating rod or stem 73. The rod or stem 73 is journaled in openings 74 and 75 in the brackets 62 and 63. The rod or stem 73 is rotatable about its axis and when it is so rotated as may be seen, the rod or member 67 is moved in a direction to tighten the brake band 59 and bring it into frictional engagement with the outer surface of the drum 35.

The brake band 59 is normally held out of engagement with the drum 35 by means of coil springs 77 and 78 which are on radially extending stems 79 and 80 extending outwardly from the brake band 59. These stems extend outwardly through slots 83 and 84 formed in a circular housing or support member 85 adjacent to the drum 35 and forming a part of the brake assembly. The springs 77 and 78 bear against surfaces adjacent to the slots 83 and 84. The brake band 59 is further supported by means of an extending bracket 87 having a slot 88 received on a pin 89 extending from the housing 85.

The actuating cylinder 33 for the auxiliary brake in the assembly 12 is shown in detail in FIG. 5. The cylinder has a piston in it formed by a flexible sleeve member 92 secured on a stem 93 by means of a nut 94 and washers 95 and 96. The stem 93 extends through a sealing fitting or gland 100 in the end of the cylinder, this fitting including a sealing member 101. The other end of the cylinder is closed by a head 103 having a threaded bore 104 which receives the end of the hydraulic line 105 which delivers hydraulic fluid to the cylinder. At the end of the stem 93 is a U-shaped member, that is, a clevis 107, in the arms of which is journaled a pin 108 for coupling the clevis to an actuating lever 110 on the end of the rod or stem 73 as previously described. As may be seen, when the piston 92 operates in the cylinder 33, it rotates the rod or stem 73 and thereby actuates the auxiliary brake band 59.

Numeral 112 designates an air line connected to the cylinder 33 which communicates with the interior of the axle 10, as shown in FIG. 1, to allow air to bleed in and out of the cylinder 33. Because of this line a vacuum is never drawn in the cylinder 33.

The left side of the axle 10 as shown in FIG. 1 forms an hydraulic fluid reservoir having a filler plug as designated at 115. The housing 15 itself forms an oil sump which is in communication with the left side of the axle 10 by way of an opening 116. The housing 15 has a bottom plate 118 attached by cap screws 119 and 120 and having a drain plug 121. The housing 15 has a top plate or cover 124 attached by cap screws as shown at 125 and 126. The control valve 19 is mounted on the cover 124.

As explained, the hydraulic pump 17 is double acting, producing a discharge pressure whether being driven forwardly or in reverse. It has two inlets, one on each side and each having a ball check valve, one of the inlets being shown at 130 in FIG. 1. The hydraulic pump 17 has two outlets, one on each side of the pump, with a ball check valve in each discharge line. One of these outlets and check valves is designated at 132 in FIG. 1 of the drawings. The two outlets are shown diagrammatically at 132 and 133 in FIG. 2. They discharge into a common line 135 connected to a T-fitting 136 which is connected by tube 137 to a port 138 in one side of the rotary control valve 19. The fitting 136 is also connected by a tube 140 to an elbow 141 which connects by way of the tube 142 to another port 143 in a side wall of the rotary valve 19. Rotary valve 19 comprises an outer cylinder or sleeve having a cylinder or rotor 145 within it. The rotor 145 may be rotated by an actuating stem 146 extending through a sealing gland 147 in the end of the cylinder 19. The stem 146 may be rotated, that is, actuated, by way of any suitable transmission means connected to the manual operating lever 21 accessible to the driver.

The cylinder of the control valve 19 has an outlet port which communicates through a tube 150 which connects to a T-fitting 151 which is in turn connected by tubes 153 and 154 with the hydraulic actuators or cylinders 32 and 33. The outlet pipe connection 150 connects to the outlet port of the control valve 19. The operating lever 21 may be moved into off, on, and hold positions with the rotor 145 being moved correspondingly. FIG. 3 is a cross-sectional view illustrating the on position of the rotor 145, and FIG. 4 is a cross-sectional view illustrating the off position. As shown in FIG. 3, the rotor 145 has a transverse port or channel 160 which in the on position brings the pipe 142 into communication with the tube or pipe 150 for allowing hydraulic pressure to pass to the hydraulic actuators or cylinders 32 and 33 for actuating the auxiliary brakes.

The cylinder 19 has an end cap 155 in which is an adjusting screw 156 with lock nut 157 for adjusting the axial operating position of rotor 145.

In the off position the transverse port 160 does not bridge between the pipes 142 and 150. In the off position a transverse port 161 connects between the pipe 137 and a drain pipe 162 which leads directly back to the sump formed by the housing 15 so that hydraulic pressure is not delivered to the auxiliary brakes 32 and 33 and they are inactive. The rotor 145 has another transverse port 163 which intersects the port or channel 161, there being a generally axial channel 164 providing communication between the port 163 and the other transverse port 160. In the off position of FIG. 4, hydraulic pressure from the actuators 32 and 33 is released through the ports 164 and 163 to the port or channel 161 and to the drain line 162. In the hold position, all of the ports or channels in the rotor 145 are out of communication with the connecting pipes and their ports and in this position the pressure which has been communicated to the hydraulic cylinders or actuators 32 and 33 through the pipes 153 and 154 is held therein until the control valve 19 is again actuated.

From the foregoing, those skilled in the art will understand the operation of the invention and will observe that it achieves and realizes all of the objects and advantages as outlined in the foregoing, as well as having many additional advantages that are apparent from the detailed description.

It will be observed that the auxiliary brakes may be operated separately or in conjunction with the regular brakes, as described in the foregoing. Power for the auxiliary brakes is from the hydraulic pump 17 which operates in either direction providing motive power whenever the vehicle is moving. One side of the axle 10 and the housing 15 provides a reservoir and sump for the hydraulic fluid. In order to operate the auxiliary brakes, the operator need merely move the operating handle to the on position which applies the hydraulic fluid to the hydraulic actuators or cylinders. Moving the handle to the off position releases the hydraulic pressure and allows the hydraulic fluid to flow back out of the hydraulic actuators or cylinders. In the hold position, the hydraulic pressure is held on the hydraulic cylinders or actuators and may be retained thereon even though the hydraulic pump is not operating.

From the foregoing, it may be seen that extremely positive means are provided to insure the maximum in safety protection by way of providing for braking facilities that are available in the event of any type of failure of the regular brakes. The source of power is from the vehicle itself and operation of the auxiliary brakes is not in any way affected or impaired by any casualty to the regular brakes. Preferably the hydraulic lines to the cylinders are placed along the frame of the truck or vehicle to be protected and out of the way.

The foregoing disclosure is representative of the preferred form of the invention and it is to be interpreted in an illustrative rather than a limiting sense, the invention to be accorded the full scope of the claims appended hereto. It is to be understood that the principle of the invention lies in providing the auxiliary brakes in addition to the regular brakes and providing them with motive power generated by movement of the vehicle itself so that the maximum in the way of safety is assured.

I claim:

1. In combination with a vehicle having wheels, the vehicle having a regular braking system including first friction means engageable with said wheels, actuating means therefor and selectively operable control means, separate additional auxiliary braking means on said vehicle and having separate friction means engageable with at least one wheel and separate actuating means, power means for operating the auxiliary brake means through said actuating means, means for constantly driving said power means from a vehicle wheel, and separate means for selectively controlling the operation of the auxiliary brake means.

2. In combination with a vehicle having wheels, the vehicle having a regular braking system including first friction means engageable with said wheels, actuating means therefor and selectively operable control means, separate additional auxiliary braking means on said vehicle and having separate friction means engageable with at least one wheel and separate actuating means, power means for operating the auxiliary brake means through said actuating means, means driving said power means from a vehicle wheel, and separate means for selectively controlling the operation of the auxiliary brake means, said power means being a hydraulic pump constantly driven by said wheel.

3. In combination with a vehicle having wheels, the vehicle having a regular braking system including first friction means engageable with said wheels, actuating means therefor and selectively operable control means, separate additional auxiliary braking means on said vehicle and having separate friction means engageable with at least one wheel and separate actuating means, power means for operating the auxiliary brake means through said actuating means, means for constantly driving said power means from a vehicle wheel, and separate means for selectively controlling the operation of the auxiliary brake means, said wheel comprising also a brake drum thereon, said first friction means being engageable with the inside of said drum and said separate friction means being engageable with the outside of said drum.

4. In combination with a vehicle having wheels, the vehicle having a regular braking system including first friction means engageable with said wheels, actuating means therefor and selectively operable control means, separate additional auxiliary braking means on said vehicle and having separate friction means engageable with at least one wheel and separate actuating means, power means for operating the auxiliary brake means through said actuating means, means for constantly driving said power means from a vehicle wheel, and separate means for selectively controlling the operation of the auxiliary brake means, said power means being a double-acting hydraulic pump constantly driven by said wheel to provide brake operating pressure whenever said vehicle is moving in either direction.

References Cited by the Examiner

UNITED STATES PATENTS

| | | | |
|---|---|---|---|
| 1,207,801 | 12/1916 | Schmidt | 188—152 |
| 1,250,361 | 12/1917 | Schallock | 188—152 |
| 1,253,357 | 1/1918 | De Lay | 188—152 |
| 1,315,236 | 9/1919 | Parker | 188—264 |
| 1,320,669 | 11/1919 | Auger | 188—79 |
| 1,380,584 | 6/1921 | Parker | 188—265 |
| 1,469,247 | 10/1923 | Bower | 188—79 |
| 1,590,675 | 6/1926 | Davis | 188—77 |
| 1,613,925 | 1/1927 | Boykin | 188—264 |
| 2,018,912 | 10/1935 | Carroll | 188—76 |
| 2,087,380 | 7/1937 | Kress | 188—152 |
| 2,118,316 | 5/1938 | Lynskey | 188—77 |
| 2,402,115 | 6/1946 | Levy | 188—106 |
| 2,645,313 | 7/1953 | Schaadt | 188—106 |
| 2,867,296 | 1/1959 | Requenes | 188—76 |
| 3,003,598 | 10/1961 | Sumner et al. | 188—264 |
| 3,044,578 | 7/1962 | Wrigley et al. | 188—264 X |
| 3,052,326 | 9/1962 | Baisch | 188—73 |

FOREIGN PATENTS 768,493  2/1957  Great Britain.

MILTON BUCHLER, *Primary Examiner.*

ARTHUR L. LA POINT, *Examiner.*

EUGENE G. BOTZ, G. E. A. HALVOSA,
*Assistant Examiners.*